Sept. 15, 1953  H. E. B. NOCHT  2,652,220
CAMERA SUPPORT MEANS FOR PHOTOGRAPHIC TRIPODS
Filed May 19, 1951  2 Sheets-Sheet 1
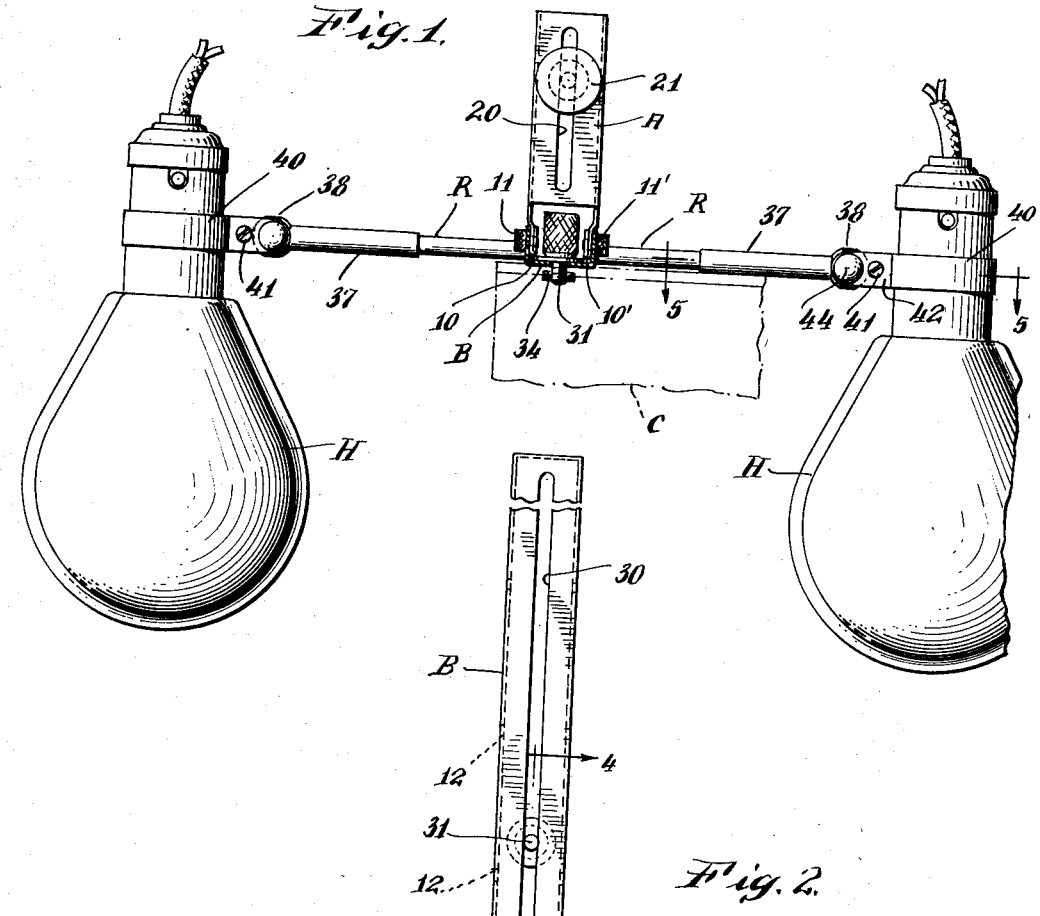
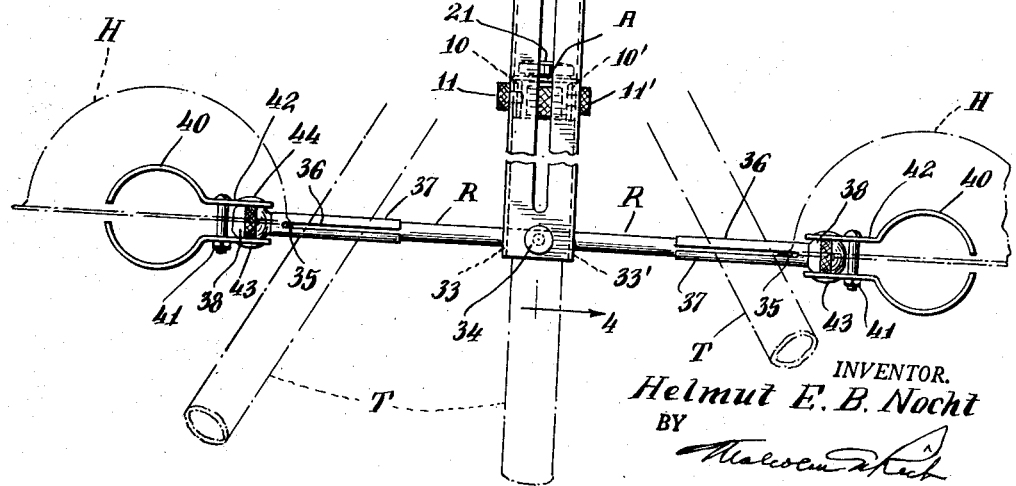
INVENTOR.
Helmut E. B. Nocht
BY
ATTORNEY.

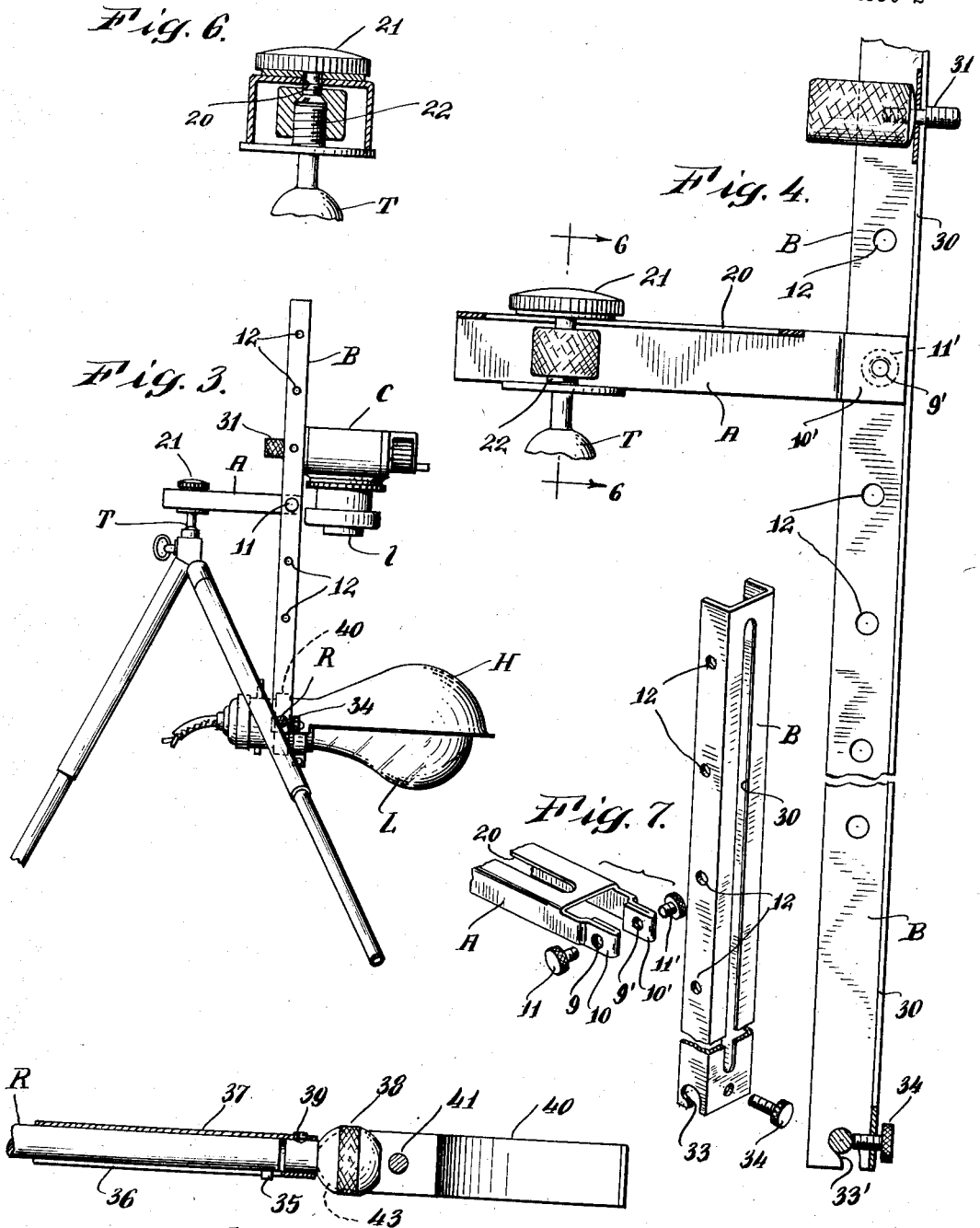

Patented Sept. 15, 1953

2,652,220

UNITED STATES PATENT OFFICE 2,652,220

CAMERA SUPPORT MEANS FOR PHOTOGRAPHIC TRIPODS

Helmut E. B. Nocht, Brooklyn, N. Y.

Application May 29, 1951, Serial No. 228,920

3 Claims. (Cl. 248—187)

1

This invention relates to photographic equipment and more particularly to photographic tripods and has for its object the provision of a camera support attachment or means for a photographic tripod by which vertical adjustment of the camera to a fixed horizontal level on the tripod may be obtained.

Another object is to provide a camera support attachment for a photographic tripod providing vertical adjustment of the camera to a fixed horizontal level by means of which the same may be converted into a copying stand.

Still another object is to provide a camera support attachment providing for the adjustment of the camera vertically to a fixed horizontal level above and below the normal horizontal level of the tripod and for the mounting of the camera with the camera lens pointing downwardly, said attachment also carrying means illuminating the base of the tripod, thereby converting the assembly into a copying stand.

Still another object is to provide a camera support means for a photographic tripod providing for the vertical adjustment of the camera to a desired horizontal position and for the rotative positioning of the camera at that horizontal level.

Other objects and advantages will be apparent as the invention is more fully hereinafter disclosed.

In accordance with these objects I have devised a camera support means for attachment to the standard type of photographic stand in which camera support means I have provided for the vertical adjustment of the camera mounted thereon to a fixed position above and below the normal horizontal level of the tripod at which position the camera lens may be located in any desired position of rotative movement about the position of attachment and for the adjustability of the attachment to adapt the same to various spread positions of the tripod legs and for means adjustably securing an illuminating means thereon.

In the specific embodiment of the invention and for purposes of illustration but not as a limitation I have illustrated the invention in the accompanying drawing as it has been adapted for use as a copying stand.

Referring to the drawings:

Fig. 1 is a top view of the camera support attachment for tripods of the present invention;

Fig. 2 is a front view of the same;

Fig. 3 is a side view of the same on a reduced scale;

Fig. 4 is an enlarged sectional view of the attachment taken along plane 4—4 of Fig. 2;

2

Fig. 5 is an enlarged sectional view of one end of the attachment taken along plane 5—5 of Fig. 1;

Fig. 6 is an enlarged sectional view taken along plane 6—6 of Fig. 4; and

Fig. 7 is an isometric view illustrating one feature of the attachment.

In the specific embodiment of the present invention the camera support attachment of the present invention may be seen to consist of two channel elements A and B, each of substantially the same U-shape in cross-section, one end of element A being cut and shaped to provide extending arms 10—10' having aligned threaded openings 9—9' therein adapting the ends 10—10' to be secured to the sides of element B by means of thumb screws or bolts 11—11' passing through spaced and aligned holes or openings 12 in each side wall of element B. By this means of attaching elements A and B together the two channel elements are secured at right angles to each other with the base of the element A facing upwardly and the base of the element B facing outwardly.

The base of each channel element A and B is provided with slot openings 20 and 30, respectively, extending substantially the full length of each element and within each slot opening 20 and 30 is disposed an over-riding nut 21 and 31, respectively.

The over-riding nut 21 in slot 20 is illustrated in section in Fig. 6 and its function is to engage the threaded upper end 22 of tripod T in such manner as to secure the element A in position thereon with element A extending outwardly therefrom substantially horizontally. By means of slot 20 the precise point of attachment of element A to the tripod T may be varied, changed or adjusted thereby to move or position element B on the opposite end thereof to a desired or fixed position relative to the vertical axis of the tripod.

This adjustment is necessary to accommodate the camera support attachment for use with the tripod at various spread positions of the tripod legs.

The function of over-riding nut 31 in slot 30 of element B is to secure the camera C to the element B in any desired position of vertical and rotative adjustment along the length of the slot 30, above and below the normal horizontal level of the tripod.

The bottom end of element B is provided with aligned bayonet slots 33—33' in the opposite side walls within which to receive and seat rod R when secured therein by thumb-screw 34. When thus mounted the rod R extends at right angles from the element B and each end of rod R is provided with pin extensions 35—35' engaging slots 36 in sleeve extensions 37 to restrain the sleeves 37 against axial rotation on the end of the rod R.

The outer end of each sleeve extension 37 is provided with a knurled ball joint 38 secured thereon by pin 39 to which ball joint 38 is secured clip means 40 by bolt 41 which clip means is adapted to engage and sustain an illuminating means L which in the instant specific embodiment is shown as consisting of an ordinary electric incandescent filament lamp and socket L with a hood H thereover directing the light radiation downwardly. As the lamp L and hood H, per se, forms no part of the invention except in combination with the remaining elements of the invention, the illustration of these elements shown in the drawings is believed sufficient for those skilled in the art to comprehend and duplicate same. Clip means 40, however, is secured to ball joint 38 in such manner as to be rotatively adjustable thereon, as by the use of concave gripping elements 43—44 of the clip means which frictionally engage opposite sides of the knurled portion of the ball joint 38 but are rotative thereon.

As may be noted from the drawings the camera support means of the present invention when in mounted position on the tripod T is adjustable horizontally by means of slot 20 in element A of the means to such position as will bring the arms R in contact position against the tripod legs and element B of the support means is adjustable by means of thumb-screws 11—11' vertically to obtain this result in a plurality of positions of horizontal adjustment of the means on the tripod. So positioned on the tripod T, the means also affords for vertical movement of the camera C along the length of slot 30 in element B by means of over-riding bolt 31 to which the camera C is secured.

The length of element B and slot 30 therein can be widely varied without essential departure from the invention as may also that of element A but I have found that the most satisfactory length of element A to be about 4 inches with element B about 8 inches for use with standard types of photographic tripods where the camera is so mounted thereon for copying purposes.

The camera C, however, can be mounted in reverse position to that shown in the drawings for overhead photographing or may be mounted with the lens pointing horizontally or at an angle to the horizontal up or down as may be desired. This flexibility of camera mounting on the support means adapts the present invention to a plurality of uses in the art of photography besides that of converting the assembly to use as a copying stand.

Having disclosed the invention generically and specifically and given one specific embodiment thereof, it is apparent that various other modifications and departures from the invention and the specific embodiment of the invention illustrated in the drawings may be made by those skilled in the art without essential departure from the invention and all such are contemplated as may fall within the scope of the following claims:

What I claim is:

1. A camera support means for photographic tripods, said means comprising a pair of channel members and means on the end of one member to secure the member to the other member at right angles thereto in one of a plurality of positions along the length of the member, a slot opening in the base wall of each channel member extending substantially the length of the member, an over-riding bolt means in each said slot opening, one said bolt being adapted to engage the head of the photographic tripod to sustain its member horizontally thereon with the other member dependingly sustained vertically on the opposite end thereof and the other said bolt means being adapted to engage and secure a camera to the other member in any desired position along the length of the slot opening in the vertically sustained member, and means on the bottom end of said vertically sustained member to detachably secure thereon side arms extending oppositely at right angles therefrom having a length adapted to engage and rest on the tripod legs next adjacent the said member.

2. The combination of claim 1, including means adjustably sustaining illuminating means on said side arms.

3. The combination of claim 1, said means on the end of one member to secure the other member at right angles thereto comprising arm extensions on the side walls thereof each having aligned threaded openings therethrough, a threaded bolt for each said threaded openings, and aligned and spaced openings in the side walls of the other said member through which the said threaded bolt may pass to engage the threaded openings of the said arm extensions to secure the said arm extensions to the said other member.

HELMUT E. B. NOCHT.

References Cited in the file of this patent

UNITED STATES PATENTS

| Number | Name | Date |
|---|---|---|
| 2,530,912 | Secofsky et al. | Nov. 21, 1950 |
| 2,551,753 | McCullough | May 8, 1951 |
| 2,568,354 | Moore | Sept. 18, 1951 |